United States Patent
Muramoto et al.

(10) Patent No.: US 6,725,423 B1
(45) Date of Patent: Apr. 20, 2004

(54) LAYING OUT MARKUP LANGUAGE PARAGRAPHS INDEPENDENTLY OF OTHER PARAGRAPHS

(75) Inventors: Takahide Muramoto, Kawasaki (JP); Toshimitsu Suzuki, Kawasaki (JP); Kazumi Saito, Kawasaki (JP); Sadao Yashiro, Kawasaki (JP); Masatomo Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/222,325

(22) Filed: Dec. 29, 1998

(30) Foreign Application Priority Data

Jul. 16, 1998 (JP) ............................................. 10-201712

(51) Int. Cl.$^7$ ................................................. G06F 7/00
(52) U.S. Cl. ....................................... 715/513; 715/517
(58) Field of Search .............................. 707/501.1, 513, 707/517; 715/501.1, 513, 517

(56) References Cited

U.S. PATENT DOCUMENTS

| | | | |
|---|---|---|---|
| 5,557,722 A | * | 9/1996 | DeRose et al. ............. 345/776 |
| 5,860,073 A | * | 1/1999 | Ferrel et al. ................. 707/522 |
| 6,023,714 A | * | 2/2000 | Hill et al. .................... 345/760 |
| 6,178,433 B1 | * | 1/2001 | Nakamura et al. .......... 707/513 |
| 6,199,082 B1 | * | 3/2001 | Ferrel et al. ................. 707/515 |
| 6,321,244 B1 | * | 11/2001 | Liu et al. ..................... 707/500 |

* cited by examiner

Primary Examiner—Stephen S. Hong
Assistant Examiner—Cesar B Paula
(74) Attorney, Agent, or Firm—Staas & Halsey LLP

(57) ABSTRACT

A display process is carried out in high speed without changing a structure of a structured document.

Within structural information of a structured document, a paragraph-forming element is obtained in which forming of a paragraph is designated in style definition information corresponding thereto. When the display information of the obtained paragraph-forming element is matched, a program for determining a relative layout of the respective display information within the paragraph is performed independent from a layout routine of another paragraph-forming element. Another program for visually outputting such display information of the paragraph-forming element whose layout routine is accomplished is carried out after the layout routines for all of the paragraph-forming elements located up-rank from the current paragraph-forming element have been accomplished.

7 Claims, 15 Drawing Sheets

Fig. 2

```
<MEMO>
<PARA1>
 This is the <emph> first </emph> paragraph.  The character font
 family name herein is min-cho, and the font size is set to 14 pt.
</PARA1>
<PARA2>
 This is the second paragraph.  The character font family name herein is gothic,
 and the font size is set to 10 pt.
</PARA2>
</MEMO>
```

Fig. 4

| NODE | SPECIFICATION |
|---|---|
| MEMO | SCROLL VIEW |
| PARA1 | PARAGRAPH FORMAT<br>FONT FAMILY NAME: MING-CHO TYPEFACE<br>FONT SIZE: 14 PT<br>LEFT INDENT VALUE: 10MM<br>RIGHT INDENT VALUE: 5MM<br>FIRST LEFT INDENT VALUE: 4MM<br>CHARACTER FEED AMOUNT: 0.1MM<br>LINE SPACE VALUE: 5MM |
| PARA2 | PARAGRAPH FORMAT<br>FONT FAMILY NAME: GOTHIC TYPEFACE<br>FONT SIZE: 10 PT<br>LEFT INDENT VALUE: 10MM<br>RIGHT INDENT VALUE: 5MM<br>FIRST LEFT INDENT VALUE: 4MM<br>CHARACTER FEED AMOUNT: 0.1MM<br>LINE SPACE VALUE: 5MM |
| emph | FONT WEIGHT: BOLD |

Fig. 7

| NODE IDENTIFIER | DIMENSIONS | START POSITION |
|---|---|---|
| $N_{21}$ | $(w_1, h_1)$ | $(x_1, y_1)$ |
| $N_{22}$ | $(w_2, h_2)$ | $(x_2, y_2)$ |
| $N_{23}$ | $(w_3, h_3)$ | $(x_3, y_3)$ |
| ⋮ | ⋮ | ⋮ |

Fig. 8

| NODE IDENTIFIER | STATUS |
|---|---|
| $N_1$ | OFF |
| $N_2$ | ON |
| $N_3$ | OFF |

Fig. 9

NODE

| NODE IDENTIFIER | NAME |
|---|---|
| N1 | MEMO |
| N2 | PARA1 |
| N3 | PARA2 |
| ⋮ | ⋮ |

Fig. 10

| NODE IDENTIFIER | STATUS |
|---|---|
| N2 | IN PROGRESS |
| N3 | AWAITING START |

LAYING OUT MARKUP LANGUAGE PARAGRAPHS INDEPENDENTLY OF OTHER PARAGRAPHS

BACKGROUND OF THE INVENTION

1. Technical Field

The present invention relates to technology for displaying electronic document information that includes markup language data describing predetermined structural elements of the document information; in particular, the invention relates to processing technology for speeding display of document information whose content is described in markup language.

2. Description of Related Art

In electronic data interchange (EDI) of documents, conventionally document content information contains markup language describing standardized structural elements of the document. The markup language usually defines the document content information only in terms of text and structure, as is the case, for instance, with documents described in SGML (Standard Generalized Markup Language). Style definition information (also referred to as a "style specification") necessary for display is managed independently from the document content (text and structure) information. Such documents described in markup language are displayed as follows.

The processing system handling the document to be displayed often effectively represents the document information structure, as written in the markup language in processing memory, by tree configurations of interconnecting nodes. Nodes herein can be understood to be document content elements identified by the components (tags) of the markup language that together fully describe the text and structure of the marked-up document. In thus processing the document information, the tree is sequentially coursed from up-rank nodes to down-rank nodes.

On those occasions when the system in the course of thus processing the document for display reaches a node having a paragraph-forming tag, the absolute display position on the display device of the character data having the offspring nodes of the paragraph-forming tag is determined and display is made.

FIGS. 2–4 illustrate an example of the foregoing. The structure of the marked-up document shown in FIG. 2 is parsed and transformed into structural information forming the tree configuration of nodes shown in FIG. 3. Thereafter, the parsed data of the tree configuration is formatted based on the style specification shown in FIG. 4, and the result is displayed on a subject display device.

To illustrate further, the tree is coursed from structural element "MEMO" of node N1, to arrive at structural element "PARA 1" of node N2. Only when style definition information designated by this structural element is obtained, can it then be understood whether the structural element is a paragraph-forming element. Herein, among the offspring nodes, nodes having character data (node N25, node N321 etc.) are found, from which display is made calculating absolute display positions on the display device.

With every coursing and arriving at a node within the tree structure having a paragraph-forming element, this is repeated. Consequently, after the display positions of character data contained by up-rank paragraph-forming elements are determined, the display positions of character data contained in down-rank paragraph-forming elements are computed.

With conventional methods of displaying electronic document information structured by markup language, there is a problem, however, with displaying documents having an enormous amount of information. In particular manuals, specifications and the like require a great deal of time to display, because the layout process for the content of the paragraph-forming elements is carried out in order element-by-element from the front of the document.

Further, in network EDI for example, text is displayed based on the content of marked-up document information distributed to and saved by servers on a network. If for example the transfer speed on the communication line to a server into which the text data belonging to a paragraph-forming node is being saved is especially slow, however, a great deal of time will be required until the node text data is in place. Herein, despite the fact that succeeding (down-rank) paragraph node information may be arriving, the processing system displaying the document information does not process the down-rank paragraph node information for display until preceding (up-rank) paragraph node information has been processed for display, which postpones the display process overall.

SUMMARY OF THE INVENTION

An object of the present invention is to enable rapid display of electronic documents described in markup language without changing the structure of such a document itself, even wherein the amount of content information of a given document is unusually large. The object is accomplished by a marked-up document visual output method, a computer readable recording medium configured with a marked-up document visual output program in accordance with the method, and a visual output device responsive to the marked-up document visual output program.

To solve the above-explained problems, the present invention in a first aspect is a structured document visual output method for a structured document processing system separately processing markup-language structured document information, and style information defining display style of the structured document information in terms of the markup language.

The structured document visual output method includes the following steps:

(a) A step of determining whether paragraph-forming elements are contained in structured document information being processed for visual output in a display sequence by the structured document processing system, the paragraph-forming elements defining paragraph formation according to the terms of corresponding style information that is available to the structured document processing system.

(b) Wherein paragraph-forming elements are contained in the structured document information, a step of carrying out in response to obtaining of display information for a current paragraph-forming element a paragraph internal layout process determining independently for each paragraph-forming element relative layout within a display information paragraph;

(c) wherein the paragraph internal layout process is completed for the current paragraph-forming element and for all paragraph-forming elements higher ranking in the display sequence than the current paragraph-forming element, a step of determining absolute display positions on a structured document processing system-associated display device for the display information contained in each paragraph-forming element up to the current paragraph-forming element; and (d) a step of outputting information processed by the structured document processing system in the foregoing steps (a), (b) and (c) as visual output to the system-associated display device.

First a paragraph-forming node designating paragraph formation in terms of the style specification is obtained from among the structural elements of the markup-language structured document information being processed for visual output by the structured document processing system. Next, the method determines whether complementary display information for the current obtained paragraph-forming node is present. If so, the method executes a paragraph internal layout process that computes relative layout, within a corresponding display information paragraph, of all display information for the current paragraph-forming node, independently of layout processes for other paragraph-forming nodes. Herein, relative layout within the paragraph is expressed by relative display position within the region in which the paragraph is laid out. The paragraph internal layout routine is carried out independently for each of the paragraph-forming nodes. In other words, the paragraph internal layout routine for each of the paragraph-forming nodes is not hindered by such factors as display information for paragraph-forming nodes up-ranking from the current paragraph-forming element being not yet completely present, or the display routine being not yet completed for upranking paragraph-forming elements.

The absolute display position on the display device of the paragraph-forming node display information for which the layout routine is finished is determined by the completion of the layout routine for all the paragraph-forming nodes up-ranking from the current paragraph-forming node. In other words, with regard to the paragraph-forming nodes for which the layout routine is finished, the size is found of the paragraph-occupying regions formed on the display device. Further, the start position of the current occupying region is expressed as an absolute coordinate taking the display positional origin as a basis, by summing the heights of all the paragraph-forming nodes up-ranking from the current paragraph-forming node. By utilizing the absolute coordinates of the start positions of the paragraph-forming nodes, the start positions on the display device of the output regions for the display information can be converted into absolute display coordinates taking the display positional origin as a basis. Accordingly, the absolute display position of paragraph-forming node display information for which the layout routine is finished is calculated after all the layout routines for paragraph-forming nodes up-ranking from the current paragraph-forming node are finished, whereupon it is output.

In a second aspect, the present invention is further a visual output method as in the foregoing first aspect, wherein in the foregoing step (b), relative layout within a display information paragraph determined in the paragraph internal layout process is expressed as coordinates taking a position of other display information laid out in the current paragraph as a reference.

The layout of display information within a paragraph is expressed by, for example, coordinates (x, y) that take as a basis a start position within one of the up-ranking display information output region paragraphs.

The invention in a third aspect is a further a structured document visual output method wherein relative layout within a display information paragraph determined in the paragraph internal layout process is expressed as coordinates taking an initial position in the current paragraph layout area as a reference.

The layout of display information within a paragraph is expressed by, for example, coordinates (x, y) that take as a basis the start position of a paragraph-occupying region formed on the display device.

The present invention in a fourth aspect is a computer-readable recording medium configured with a structured document visual output program for a structured document processing system separately processing markup-language structured document information, and style information defining display style of the structured document information in terms of the markup language. The structured document visual output program is for executing:

(a) a step of obtaining from structural elements of markup-language structured document information being processed for visual output in a display sequence by a structured document processing system a paragraph-forming element designating paragraph formation in corresponding style information available to the structured document processing system;

(b) a step of determining whether complementary display information for an obtained current paragraph-forming element is present, and in case complementary display information is not present, storing the current paragraph-. forming element as a standby paragraph-forming element; wherein complementary display information for the obtained paragraph-forming element is present, (c) a step of executing a paragraph internal layout process for determining relative layout within a display information paragraph of all display information for the current paragraph-forming element, independently of layout processes for other paragraph-forming elements;

(d) a step of determining whether display information complementary to any among the standby paragraph-forming elements is present, and of excluding any such display-information complemented paragraph-forming elements from storage as a standby paragraph-forming elements; and after the paragraph internal layout process is ended for the current paragraph-forming element and for all paragraph-forming elements higher-ranking in the display sequence than the current paragraph-forming element, (e) a step of visually outputting the display information processed in steps (a), (b), (c) and (d) of the structured document visual output program for the current paragraph-forming element and for all paragraph-forming elements higher-ranking than the current paragraph-forming element.

In a fifth aspect, the present invention is a structured document visual output system for separately processing markup-language structured document information, and style information defining display style of the structured document information in terms of the markup language, and includes obtain paragraph-forming element means, determination and storing means, layout means, standby excluding means, and output means.

The obtain paragraph-forming element means is for obtaining, from structural elements of markup-language structured document information being processed for visual output in a display sequence by said structured document visual output system, a paragraph-forming element designating paragraph formation in corresponding style information available to the structured document processing system. The determination and storing means determines whether complementary display information for an obtained current paragraph-forming element is present, and in case complementary display information is not present, stores the current paragraph-forming element as a standby paragraph-forming element. The layout means executes a paragraph internal layout process for determining relative layout within a display information paragraph of all display information for the current paragraph-forming element, independently of layout processes for other paragraph-forming elements. The standby excluding means determines whether display information complementary to any among the standby paragraph-forming elements is present, and excludes from storage as a standby paragraph-forming element(s) those paragraph-forming element(s) for which complementary display information is present. The output means visually outputs the display information processed by said structured document visual output system for the current paragraph-forming element and for all paragraph-forming elements higher-ranking in the display sequence than the current paragraph-forming element, after the paragraph internal layout process is ended for the current paragraph-forming element and for all paragraph-forming elements higher-ranking than the current paragraph-forming element.

The foregoing and other objects, features, aspects and advantages of the present invention will become more apparent from the following detailed description in conjunction with the accompanying drawings.

BRIEF DESCRIPTION OF THE DRAWINGS

FIG. 2 represents an illustrative example of paragraphs from a markup-language structured document;

FIG. 4 is a diagram of a style sheet containing style information defined in association with the grove structure illustrated in FIG. 3;

FIG. 7 is a character data output area information list illustrating size and initial position of output areas for the character data within a paragraph forming element;

FIG. 8 is a parsing completed status list illustrating completed status in the parsing of structural element content from a markup-language structured document;

FIG. 9 is a node list corresponding node identifiers (keys) with structural elements (nodes);

FIG. 10 is a layout routine status status list illustrating progress status of a layout routine for nodes having a paragraph forming element;

DETAILED DESCRIPTION OF THE PREFERRED EMBODIMENTS

Next, the present invention will be described in detail with reference to the drawings.

Figure 1:
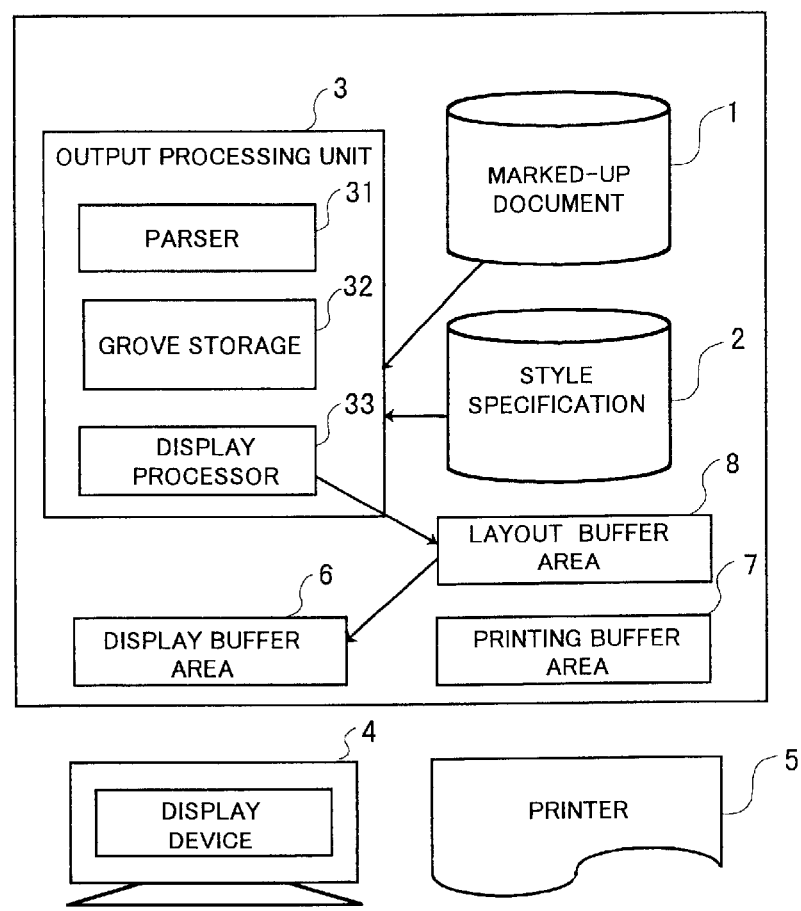
FIG. 1 is a schematic diagram of a structured document processing system in which the present invention may be employed.

In FIG. 1, there is shown an example of the layout of a structured document processing system KS. The structured document processing system KS includes a marked-up document 1, style definition information (style specification) 2, an output processing unit 3, a display device 4, and a printer 5. This structured document system KS performs display and printing operations for the display device 4 and the printer 5, and also processing and editing operations of the marked-up document 1. The structured document system KS has a display buffer region 6 and a printing buffer region 7 corresponding to the display device 4 and the printer 5. The structured document system KS further has a layout buffer region 8.

The marked-up document 1 is described in accordance with a predetermined standard such as SGML. The style definition information 2 is described in accordance with a predetermined standard such as DSSSL (Document Style Semantics and Specification Language). The output processing unit 3 will be explained later. In the display buffer region 6 and the print buffer region 7, display attribute information and display information such as character data and image data are set so as to execute display and printing operations. In the layout buffer region 8, display attributes and positional information used to determine display position of display information on the display device 4 are stored.

Figure 3:
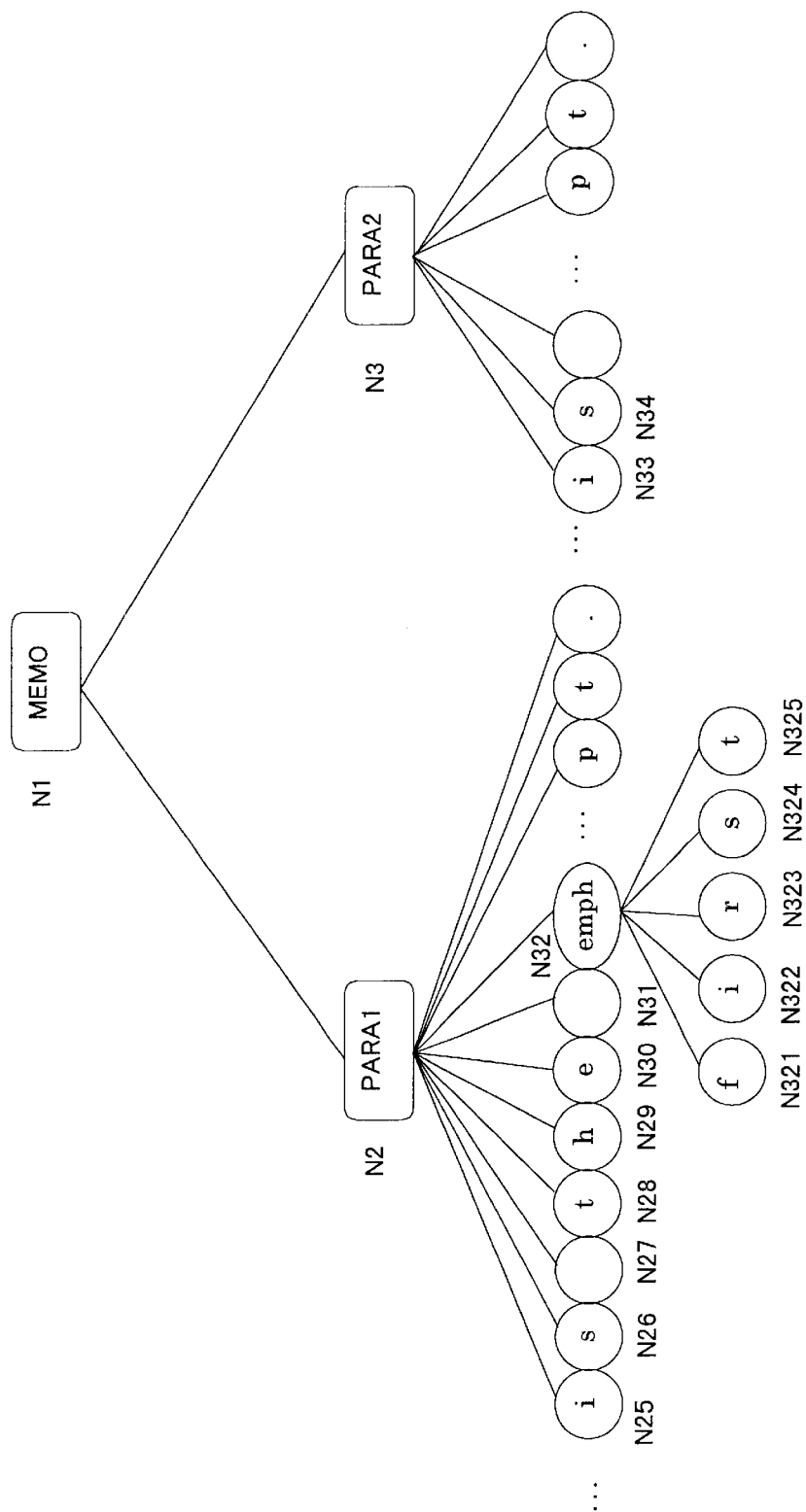
FIG. 3 is a diagram of a grove structure representing information obtained by parsing the structured document paragraphs shown in FIG. 2.

Reference is made to FIG. 3, a grove structure representing information obtained by parsing the structured document paragraphs illustrated in FIG. 2, and to FIG. 4, representing a style sheet containing style definition information defined in association with the grove structure shown in FIG. 3.

The output processing unit 3 contains a parser 31, a grove storage 32, and a display processor 33. The parser 31 analyzes the document marked-up by SGML exemplified in FIG. 2 as a grove representation exemplified in FIG. 3, and then outputs this grove representation to the grove storage 32. With regard to the processing operations of the parser 31, the parsing and the production of the grove representation are carried out in accordance with the international standard rule (ISO8879), and therefore a detailed description thereof is omitted. The grove storage 32 stores therein the structural information of FIG. 3 outputted from the parser 31. The display processor 33 visually outputs the processed result based upon the structural information stored in the grove storage 32 to the display device 4.

Figure 5:
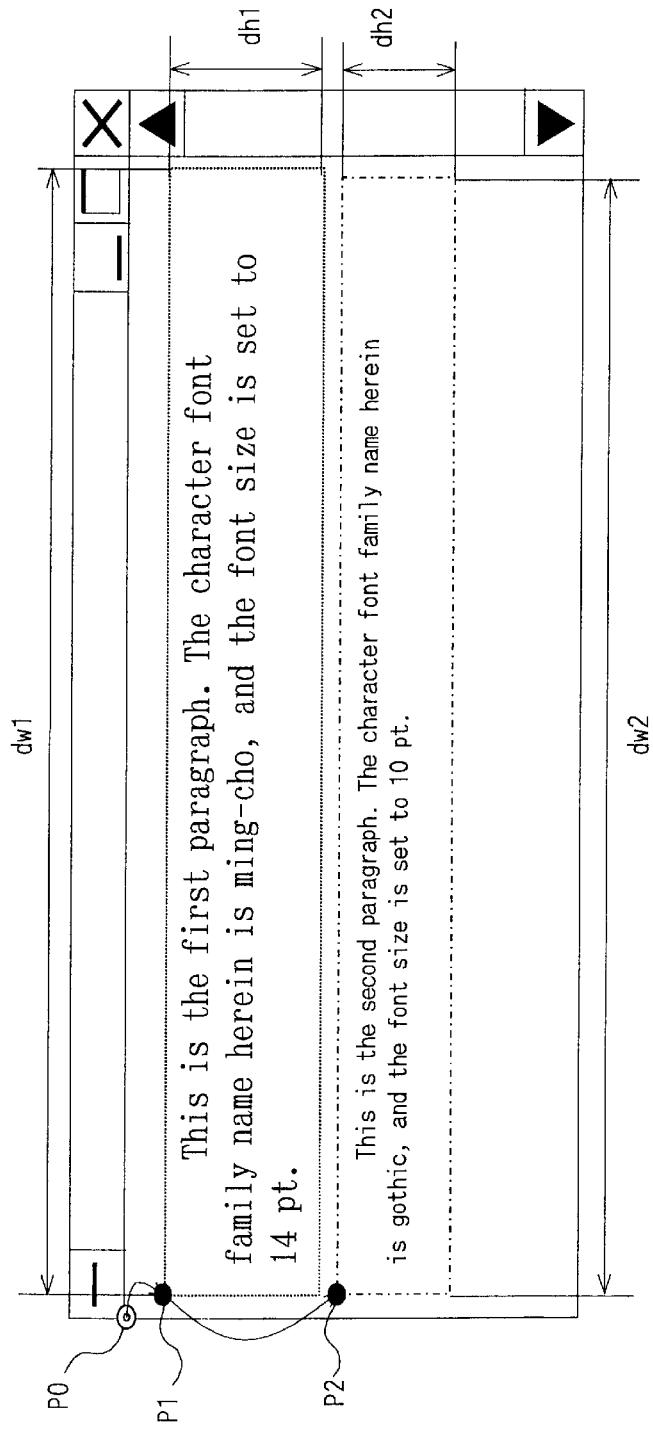
FIG. 5 is an illustration of the structured document paragraphs of FIG. 2 in display on a display device.

Next, as to the display processor 33, a description will now be made of the situation wherein the above-described marked-up document shown in FIG. 2 is displayed on the display device 4. Reference is accordingly made to FIG. 5, a diagram illustrating the corresponding portion of the structured document in display on the display device 4, and to FIG. 6, which illustrates the situation wherein the start position of an occupying region of a paragraph is employed as a reference, and output regions of the respective character data are virtually laid out at relative positions within the foregoing occupying region. It is assumed that the starting positions of the occupying regions of the respective paragraphs are located at upper left positions of these regions.

The display processor 33 reads the parsed grove, and calculates relative positions of output areas within an occupying region of a paragraph, which is formed on the display device by the paragraph-forming element, as to the output areas of the character data located down-rank from a node having the paragraph-forming markup tag. This relative position will now be explained with reference to FIG. 5 and FIG. 6. In FIG. 5, the occupying region of the paragraph which is formed by a first paragraph forming node (markup tag) corresponds to the region defined by start position P1, width dw1, and height dh1. The occupying region of the paragraph which is formed by a second paragraph forming node corresponds to the region defined by start position P2, width dw2, and height dh2.

Figure 6:
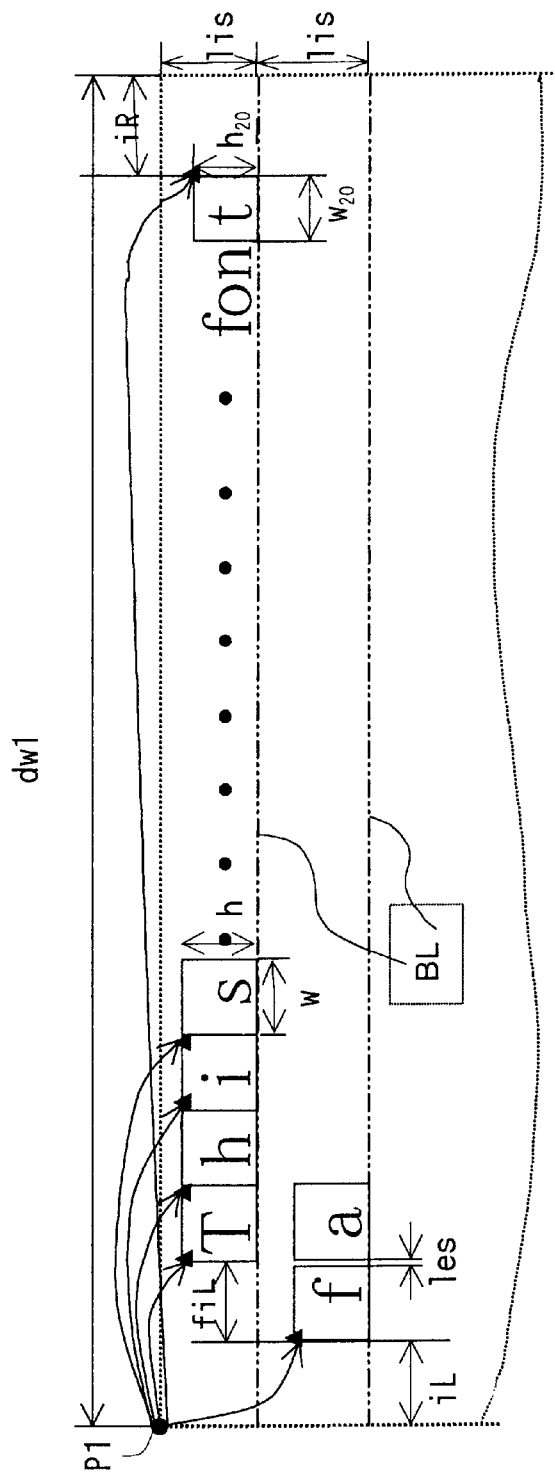
FIG. 6 corresponds to an enlarged view of FIG. 5, and illustrates an initial portion of the first of the structured document paragraphs of FIG. 2 in a virtual layout.
Figure 11:
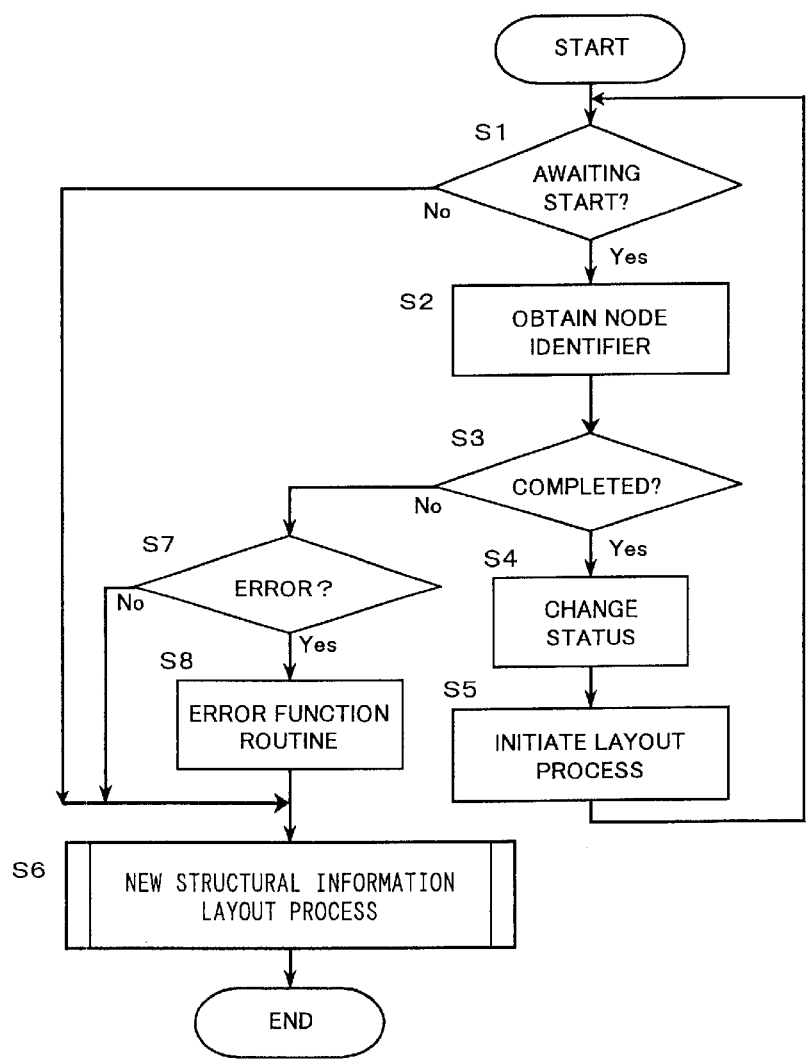
FIG. 11 is a flow chart diagramming flow of a main routine 1 that the display processor illustrated in FIG. 1 executes.

In FIG. 6, the output region for all of the character data is determined based upon these character data and style information designated in a paragraph forming node located up-rank from the current paragraph-forming node. The output region is laid out on a virtual base line (BL) and is defined by width w and height h. The start position of the output region for the character data is expressed by a relative coordinate wherein start positions P1, P2, . . . of the occupying regions of the respective paragraphs are used as origins. As a consequence, the absolute position of the output region of character data wherein the origin (PO) on a display device is employed as a reference may be determined by defining the starting positions P1, P2, . . . of the occupying regions of the paragraphs containing the associated character data. The start position of the occupying region of each of the paragraphs may be calculated in such a manner that the layout routines for all of the paragraph-forming elements located up-rank from the current paragraph node are completed, and thus width dw of the occupying region of the paragraph and height dh thereof are determined. It should be understood that although only the character data are illustrated in FIG. 5 and FIG. 6, display data such as image data other than the character data could serve as similar examples.

The calculated dimensions of the output regions and the calculated start positions thereof are written into a character data output region information list illustrated in FIG. 7 in connection with the respective character data. Also, the display processor 33 forms a parsing completion status list as shown in FIG. 8, and a node list as shown in FIG. 9. In the parsing completion status list shown in FIG. 8, status as to whether the parsing of the contents of the structural elements belonging to the respective nodes are completed is written. A parsing completed status indicates that both start tag and an end tag are confirmed in parsing the structured document. In the parsing completion status list shown in FIG. 8, parsing of one node N2 is completed (ON), while that of another node N3 is not (OFF). Accordingly, the other node N1 for which both node N2 and node N3 are lower-ranking is not completed (OFF). In the node list of FIG. 9, corresponding node identifiers (keys) are stored with the markup elements belonging to the nodes.

Furthermore, the display processor 33 monitors status of the layout routine with respect to each node having a paragraph-forming element, and then writes the monitored layout routine status into a layout routine status list as shown in FIG. 10. Therein a "start waiting" node N3 indicates that the layout routine cannot be executed because display data complementary to the current paragraph-forming element is not present. Also, "under execution" node N2 indicates that the layout routine is being executed for the current paragraph-forming node. When the layout routine is completed, the entry of this node is deleted from the layout routine status list. Since the layout routine status list is formed when the grove representation is coursed from the up-ranking nodes to down-ranking nodes, the node identifiers are registered in this order, i.e., defined from up-ranking to down-ranking in the grove.

Referring now to the flow charts of FIGS. 11 to 15, the document processing operation executed by the display processor 33 will be explained.

The display processor 33 commences the display program by reading sequentially the structural information parsed by the parser 31. First, at step S1, referring to the layout routine status list of FIG. 10, it is determined whether there is a node having a paragraph-forming element in "awaiting start" (standby) for the layout routine. If YES, then the display processing routine advances to step S2. Conversely, if NO, then the display processing routine advances to a new structural information layout routine (explained later) defined at step S7. In other words, before the layout routine is executed in respect of structural information which has been newly added to the grove representation, if there is a node having a paragraph-forming element within the thus far constructed grove representation of the structural information, for which the layout routine has not yet been executed, the layout routine for that node has priority and is executed.

At step S2, a node identifier under the "awaiting start" status is obtained by reference to the layout routine status list shown in FIG. 10.

At step S3, referring to the parsing completion status list of FIG. 8, from the obtained identifier, it is determined whether the parsing of the markup content corresponding to this node is completed. If YES, then the layout routine can be carried out. Therefore, the program advances to step S4. Conversely, if NO, then the program advances to later explained step S7.

At step S4, the layout routine status for the current node in the layout routine status list of FIG. 10 is changed to "under execution." At step S5, the node identifier having this markup is transferred to a later discussed layout routine so as to initiate the layout routine for this node. This layout routine is carried out independently from the main routine 1. After the layout routine is initiated, the program is again returned to the previous step S1. Herein, it is determined whether there is a node awaiting start of the layout routine (i.e., whether there are any nodes in standby).

When it is determined at step S1 that there are no nodes in standby for the layout routine, the program advances to step S6.

At step S6, executing a fresh structural information layout routine (explained later), a layout routine is carried out for structural information which has been newly added to the grove.

When it is determined at the above step S3 that parsing of the markup content corresponding to the current node is not yet completed, the program advances to step S7. At step S7, it is determined whether the parsing has not yet completed due to an error. If YES, then the program advances to step S8. At step S8, an error routine is carried out in response to the nature of the error.

For example, it would be conceivable to execute the layout routine by assuming that the parsing is completed, and perform a process that lays out only the existing display data; or notifying the user with an error message utilizing a dialog box or the like on the display device. As another error routine, in case markup content corresponding to the current node is present on the network, a link format may be employed by directly utilizing location information (for example, VRL). If NO, then the program advances to the above step S6 at which the new structural information layout routine is carried out.

In other words, with regard to a node for which parsing has not yet been completed, the layout routine is carried out in advance for structural information newly added to the grove, without waiting for completion of the parsing.

Figure 12:
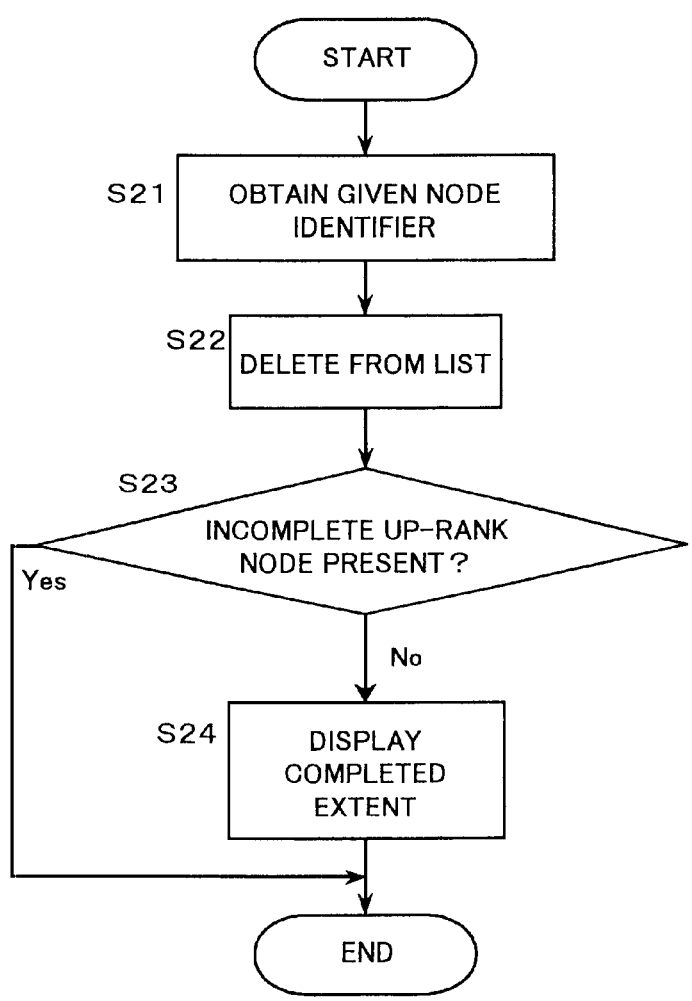
FIG. 12 is a flow chart diagramming flow of a main routine 2 that the display processor executes.

With reference to FIG. 12, the display processor 33 executes the routine described below, independently of the above-mentioned main routine 1 and the later explained layout routine. This routine is started by receiving a layout completion notification containing a node identifier from the layout routine.

First, at step S21, the node identifier contained in the layout completion notification is obtained.

At step S22, the entry of the obtained node identifier is deleted from the layout routine status list of FIG. 10.

At step S23, by reference to the layout routine status list, it is determined whether a node more up-ranking than the deleted node remains. If there is no up-ranking node, then the layout routines for all of the nodes more upranking than the obtained node are completed, and width and height of an occupying region of each paragraph on the display device are calculated. As a result, the program advances to step S24. Conversely, wherein an upper-ranking node is listed, since the start position within the display region that this paragraph will occupy cannot be determined, the program is completed.

At step S24, it is determined whether a node lower-ranking than the deleted node is left with reference to the layout routine status list. If there is no down-rank node, the layout routine becomes finished from the deleted node until the last of the parsed structure data portions that are read in. Conversely, wherein there is a down-rank node present, the layout routines for nodes from the deleted node up to the node just before the down-rank node become completed. Accordingly, the character data contained by the nodes within the range in which the above-mentioned layout routines are completed can be displayed on the display device.

Figure 13:
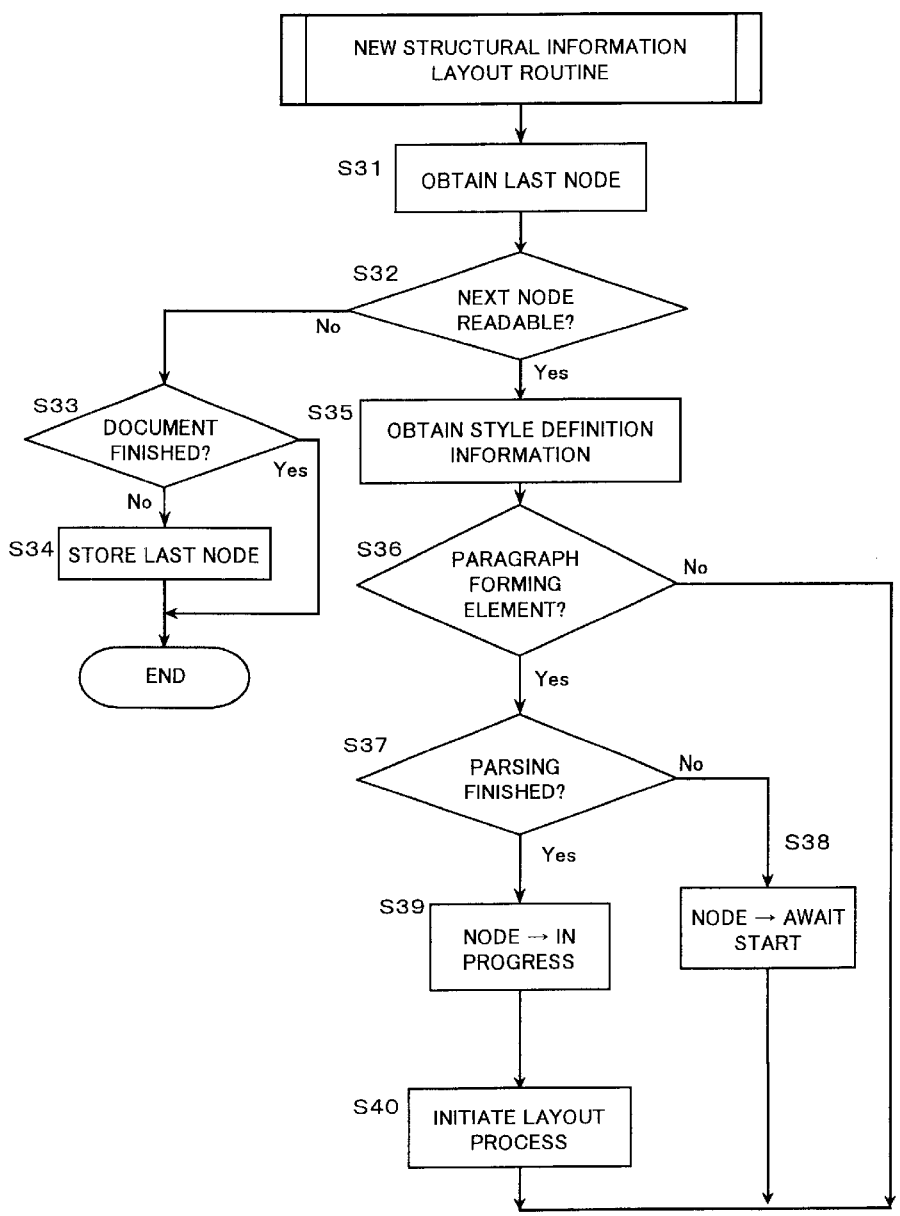
FIG. 13 is a flow chart diagramming flow of a fresh structural information layout routine that the display processor executes.

The program advances to step S7 in the above-mentioned main routine 1, by which a fresh structural information layout routine, shown in FIG. 13, is started.

At first, at step S31, a final read node identifier is obtained. This final read node identifier indicates which portion of the grove representation of the structured document has been read (coursed) in the preceding fresh structural information layout routine. This final-read node identifier is set as the current node.

Since there is no previous final-read node identifier in the layout routine immediately after the structured document processing system of the present invention is booted, however, a fresh structural information root node is made the current node.

At step S32, it is determined whether a node (namely, an immediately down-ranking node) subsequent to the current node is read. If NO, then the new structural information layout routine advances to step S33. Conversely, if YES, then the node subsequent to the current node is set as a current node, and a markup element is obtained from the node list. Then, the program advances to step S35.

At step S33, it is determined whether the structured document is completed. This determination is carried out by checking as to whether both a starting root tag and an end root tag are confirmed when the structured document is analyzed. If the structured document is completed, then the program is ended. Conversely, if the structured document is not completed, then the program advances to step S34.

At step S34, the identifier for the current node is stored as the final-read node identifier, and the program is ended.

At step S35, style definition information corresponding to the structural element belonging to the current node is obtained from the style sheet.

At step S36, it is determined whether the structural element belonging to the current node is equal to the paragraph-forming element. When the current structural element is not equal to the paragraph-forming element, the program is returned again to the previous step S32. At step S32, the next-level node is read. Conversely, when the current structural element is equal to the paragraph element, the program advances to step S37.

At step S37, it is determined whether the parsing of the content of the structural element belonging to the current node is completed, by referring to the parsing completion list. When the parsing is not completed, the program advances to step S38. Conversely, when the parsing is completed, the program advances to step S39.

At step S38, the identifier of the current node is registered as a "begin standby" state into the layout routine status list.

At step S39, the identifier of the current node is registered as an "under execution" state into the layout routine status list.

At step S40, the later explained layout routine is initiated in order to determine a relative display position within a paragraph of display data of the paragraph-forming element belonging to the current node. After this layout routine is initiated, the program is again returned to step S32, at which the next node is read.

That is, in the fresh structural information layout routine, the layout routine is carried out only for the paragraph-forming element for which the parsing of the display data is completed.

Figure 14A:
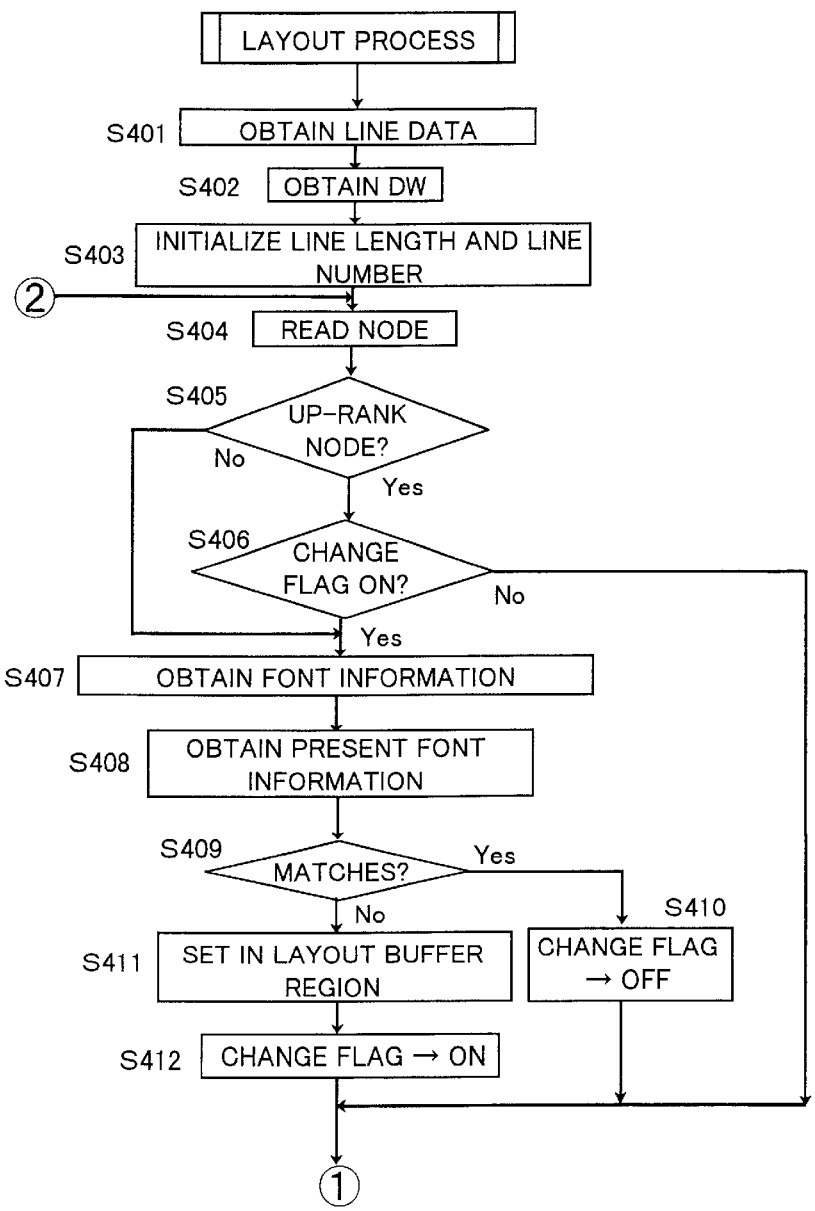
FIGS. 14A and 14B are a flow chart diagramming flow of a layout routine that the display processing unit executes.
Figure 14B:
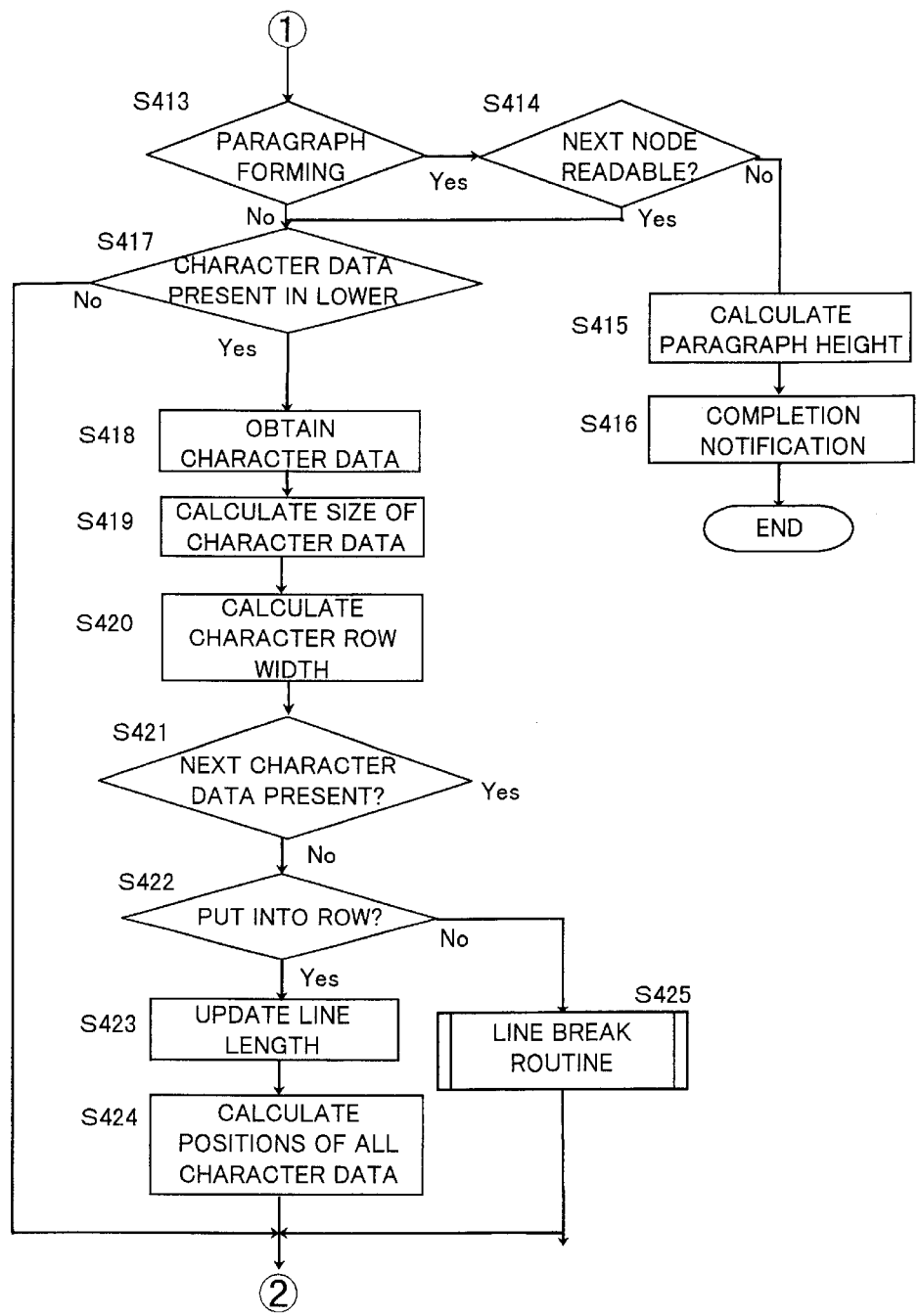

The display processor 33 executes the layout routine indicated in FIG. 14 independent from the above-mentioned main routines 1 and 2 so as to determine a relative display position of character data of a paragraph-forming element within a paragraph.

At either step S5 of the above-explained main routine 1 or step S40 of the above-described new structural information layout routine, the identifier of the node having the paragraph-forming element is supplied so as to initiate the layout routine, so that this layout routine is commenced.

First, at step S401, a structural element is obtained from the supplied node identifier by referring to the node list. Referring now to style definition information corresponding to this structural element, a left indent value iL; a right indent value iR; a first-row relative left-indent value fiL; letter spacing les; and line spacing lis are obtained.

At step S402, width dw of an occupying region of a paragraph formed by this structural element on the display device is obtained. There are two cases, namely, the width dw of the occupying region is defined in the style definition information, and also this width depends upon a width of a display allowable region on the display device.

At step S403, a current value of a line length 11 and a current value of a line number in are initialized:

$(ll=iL+fiL; ln=1)$.

At step S404, a node of the supplied node identifier is read (will be referred to as a "current node").

At step S405, it is determined whether the current node is equal to such a node located up-rank from the previously read node. When the current node is such a node located in the upper grade than the previously read node, the program advances to step S406. Conversely, when this current node is such a node located in a lower gate than the previously read node, the program advances to step S407.

At step S406, it is determined whether a display attribute change flag is set to ON. In this case, the display attribute change flag corresponds to a flag capable of identifying as to whether a display attribute is changed in nodes located in a lower grade when nodes in an upper grade are coursed. At this step S406, in the case that the display attribute change flag is set to ON, since the display attributes of the previously read down-rank node are different from that of the current node, the program advances to step S407. When the display attribute change flag is set to OFF, since the display attributes of the previously read down-rank node are not changed from that of the current node, the program advances to step S413 (will be discussed).

At step S407, font information such as character size and font type is obtained which is set to the layout buffer region.

At step S408, referring to the style sheet, style information is obtained which is related to the font, i.e., character size and font type, corresponding to the markup element corresponding to the current node.

At step S409, a comparison is made as to whether the present font information is made coincident with the font information set to the layout buffer region. When this present font information is made coincident with the set font information, since the display attribute is not changed, the program advances to step S410. At this step S410, the display attribute change flag is set to OFF. Conversely, when this present font information is not made coincident with the set font information, it may be determined that the display attribute is changed, and thus the program advances to step S411.

At step S411, the font information such as the character size and the font type, which is defined in the present current node, is set to the layout buffer region.

At step S412, the display attribute change flag is set to ON.

At step S413, it is determined whether the current node has the current paragraph-forming element. When the current node is not the current paragraph-forming element, the program advances to step S417. Conversely, when the current node is the current paragraph-forming element, the program advances to step S414.

At this step S414, it is determined whether a child node located in a lower grade than the current node is subsequently read. If this child node is read, then the program advances to step S417. Conversely, if this child node is not read, then the program advances to step S415.

At step S415, the height dh of an occupying region of the current paragraph on the display device is calculated (dh= ln*lis) based on the line number ln and then this calculated height is stored together with the above-explained width dw.

At step S416, a layout completion notification to the main routine 2 is sent in combination with the current node identifier, and the program is accomplished.

At step S417, it is determined whether a node having character data is present directly in a low grade with respect to the current node. If YES, then the program advances to step S418. If there is no such a node having the character data, the program is returned to the previous step S404. At this step S404, the next node is read in accordance with the structural information.

At step S418, the character data is obtained.

At step S419, the width w of an output region and a height h thereof on the display device are calculated from the obtained character data. These calculated width and height are written together with the identifier of the current node into the character data output region information list shown in FIG. 7.

At step S420, the width w1 is calculated of an area that character data, obtained in step S418 and added to the consecutive character data row, occupy on the display device. In other words, the character data output area width w found at step S419 and the letter spacing les are added to the width w1 of the area occupied up to the present.

At step S421, it is determined whether a node having character data is directly located lower than a current node in the same hierarchical level. If there is such a node having the character data, than the program is returned to the previous step S418. Conversely, if there is no such a node having the character data, then the program advances to step S422.

In step S422 it is determined whether the consecutive character data obtained at step S418 will fill out the virtual line in the midst of forming the current paragraph. In other words, it is determined whether a value that is the occupied area width of the character data row calculated in step S420 added to the present line length exceeds the maximum line length (dw−iL−iR) of the current paragraph. If the character data row is the beginning of the current paragraph, the initial position of the character data row on the display device is represented by the value (iL+fil), which is the first-row relative left-indent value added to the left indent value. If the character data row is the beginning of a second or a later line, the initial position of the character data row on the display device is represented by the left indent value (iL). If the character data row is in the midst of a line, the initial position of the character data row on the display device is represented by the sum (ll+les) of the line length and the letter spacing.

Wherein the character data row will fit into the virtual line in the midst of forming the current paragraph, the process flow moves to step S423. Wherein the character data row will not fit into the virtual line, a later-mentioned line break routine of step S425 is executed.

At step S423, the line length of (ll) is updated by (ll+les+wl).

At step S424, as to a starting position of output regions of each of the character data obtained at step S418 with respect to the display device, a relative position is calculated to be written into the character data output region information list of FIG. 7. This relative position is expressed by an (x, y) coordinate while the starting position of the occupying region of the current paragraph on the display device is used as an origin.

Figure 15:
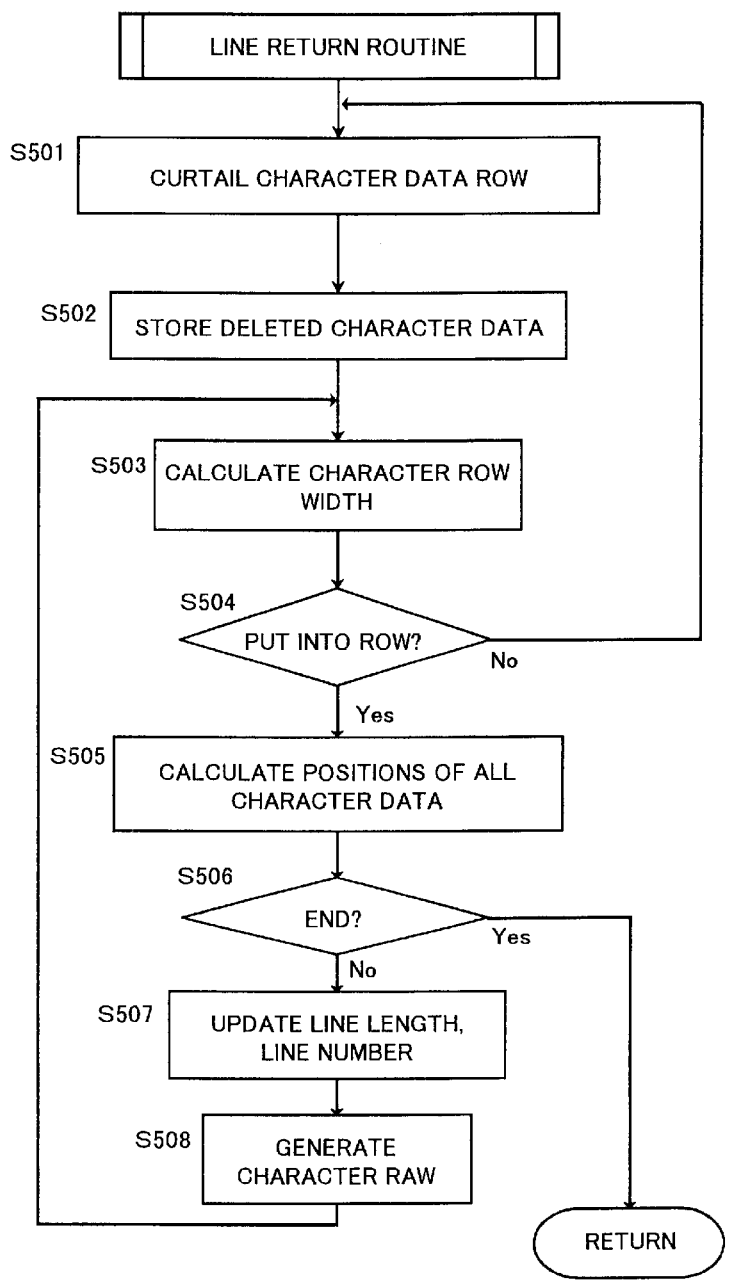
FIG. 15 is a flow chart diagramming process flow of a start new line subroutine.

When it is determined at step S422 of the above-explained layout routine that the character data row cannot fit into the virtual line in the midst of forming the current paragraph, the line break process subroutine illustrated in FIG. 15 is executed.

First, at step S501, such a character data row is produced from which character data at a last position of a current character data row has been deleted. At the time when the execution of the line break routine subroutine is commenced, the current character data row becomes the character data row supplied at the previous step S422.

At step S502, an identifier of a node having the deleted character data is stored.

At step S503, referring to the character data output region information of FIG. 7, a calculation is made of a width of an occupying region of the current character data row on the display device.

At step S504, such it is determined whether a value calculated by adding the occupying region width of the character data row calculated at the previous step S503 to the present line length (ll) exceeds a maximum line length (dw−iL−iR) of the current paragraph. If this value does not exceed the maximum line length, then the program advances to step S505. If this value exceeds the maximum line length, then the program is again returned to the previous step S501. At this step S501, the character data row is shortened.

At step S505, as to a starting position of an output regions of each of the character data contained in the above-described character data row with respect to the display device, a relative position is calculated to be written into the character data output region information list of FIG. 7. This relative position is expressed by an (x, y) coordinate while the starting position of the occupying region of the current paragraph on the display device is used as an origin.

At step S506, it is determined whether the starting position of the output regions within the paragraph have been calculated as to the respective character data contained in the character data row supplied at the previous step S422. If these starting positions have not yet been calculated, then the program advances to step S507. Conversely, if these staring positions have been calculated, then the program is returned to the previous layout routine.

At step S507, while the line length is set as the left indent value iL, the line number is incremented (ll=iL, ln=ln+1).

At step S508, based upon the node identifier stored at the previous step S502, the remaining character data row started from the character data having this node identifier is set as the current character data row, and then the program is returned to the previous step S503.

The above-explained layout program as illustrated in FIG. 6 will now be explained with reference to such a case that as to the structured document of FIG. 2 having the tree structure shown in FIG. 3, a starting position of an output region of character data is calculated as a relative coordinate within a paragraph while starting positions P1, P2 of occupying regions of a paragraph are used as a reference.

When the node identifier N2 having the paragraph-forming element is supplied from either the above-explained main routine 1 or the above-described new structural information layout routine, a width dw1 of an occupying region of a paragraph formed on the display device is calculated, and then the line length ll=iL+fil and the line number in=1 (steps S402 and S403). Furthermore, a display attribute is set to the layout buffer region in accordance with the style definition information of the read tag "PARA1" (steps S405 to S412). Next, it is determined whether a node containing character data is directly located lower than the node N2 (step S417). Because of the presence of a node having the tag "emph" in the midst of the node having the tag "PARA1" character data is obtained only from nodes N21 through N30 and N31 having character data "T" . . . "e" and [character space], up-rank from "emph" (step S418).

Subsequently, widths (w1, w2, w3, w4) and heights (h1, h2, h3, h4) of output areas on the display device for all the character data are found from the obtained character data and written into the character data output area information list, and the width of the output area of character data row "This" (w1=w1+w2+w3+w4+2*les) is found. Next, another judgement is made as to whether a value obtained by adding the character row length w1 to the present line length "This" exceeds the maximum line length (dw−iL−iR) of the current paragraph (step S422).

If this value does not exceed the maximum line length, then the line length is updated (ll=ll+w1). While setting the starting position P1 of the occupying region of the paragraph as a reference, starting positions of the output regions of the character data of "T," "h," "i" and "s" are calculated by way of the (x, y) coordinate. In the example shown in FIG. 6, the coordinates of the initial position of the output area for the character data for "T" become (iL+fiL, lis−h1); the coordinates of the initial position of the output region for the character data for "h" become (iL+fiL+w1+les, lis−h2); the coordinates of the initial position of the output region for the character data for "i" become (iL+fiL+w1+w2+2*les, lis−h3); and the coordinates of the initial position of the output region for the character data for "s" become (iL+fiL+w1+w2+w3+3*les, lis−h4). The calculated coordinates of the starting positions are written into the character data output region list of FIG. 7 (step S424).

Next, node N32 having the tag "emph" is read, and then a display attribute is set in accordance with the style information corresponding thereto. Next, since there are five nodes containing character data located directly below node N32 (step S417), character data "first" is obtained from nodes N321–N325. Similar to the above-described case, widths and heights of output areas on the display device are found based upon the display attribute and the respective character data. The calculated widths and heights are written into the character data output area information list. Then, the width w1 of the output region of such a character data row "first" is calculated. Subsequently, the present line length (ll+les) is calculated, and it is determined whether a value (ll+les+w1) obtained by adding the width of the output region of the character data row "first" to the present line length exceeds the maximum line length (dw−iL−iR) of the current paragraph. If this value does not exceed the maximum line length, then the line length ll is updated, and the starting positions of the output regions for the character data "f," "i," "r," "s," and "t" are calculated. Then, the calculated initial positions are written into the character data output region information list.

Next, in accordance with the structural information, the node N2 having the structural element "PARA1" located in the upper grade is again read, and character data for "p," "a," "r," "a," etc. located directly below node N2 are obtained. A calculation is made of an output area width w and an output area height h are found for each of the obtained character data. The calculated output region widths w and heights h are written into the character data output region information list. Then, width w1 of an output region of a character data row containing the letter spacing les is calculated.

The line break routine is carried out in the case that a sum (ll+les+w1) of the calculated w1 of the character data row and the present line length (ll+les) exceeds the maximum line length (dw−iL−iR) of the current paragraph. In other words, while the character data located at the final position are deleted one by one from the character data row, it is determined whether this deleted character data row can be filled into the virtual line while the current paragraph is formed. In the case that is becomes (ll+les+w1) <(dw−iL−iR), such a character data row from which the character data has been finally deleted is laid out at the next line. In the example of FIG. 6, such a character data row "This . . . font" can fit into the first line, and character data row "family . . . " is laid out into the second line and subsequent lines. Also, starting positions of the output regions of the respective character data laid out in the first line are calculated as (x, y) coordinate values while the starting position P1 of the occupying region of the paragraph is set as a reference. The calculated coordinate values of these starting positions are written into the character data output region list of FIG. 7.

Next, assuming now that the line length is equal to the left indent value iL; the line number ln is equal to 2; and the height of the paragraph is equal to ln*lis, a calculation is made of a width w1 of an output region of the remaining character data row "family . . . ." Wherein the width w1 of the output region of the remaining character data row exceeds the maximum line length (dw−iL−iR), the final character data of the character data row is again deleted one by one. Subsequently, a similar program to the above case is carried out, and coordinate values are calculated as to the starting positions of the output regions for all of the character data while the starting position P1 of the occupying region is used as an origin. Also, the height dh of the occupying region of this paragraph can be calculated as ln*lis from the final line number ln.

Both the occupying region width dw1 of the above paragraph and the height dh1 thereof are stored, and a layout completion notification for the main routine 2 is sent together with the node identifier N2. Upon receipt of this notification, the entry of the node identifier N2 is deleted from the layout routine status list of FIG. 10 is deleted. Also, since both a width of an occupying region of a paragraph and a height thereof formed from a paragraph-forming element "PARA1" are calculated, a starting position P2 of an occupying region of a paragraph which is formed corresponding to another paragraph-forming element "PARA2" of a brother node of node N2 may be calculated by an origin P0 on the display device. Herein, "brother node" means a node immediately following the current node in the same hierarchical level.

As a consequence, for example, wherein the content of the paragraph-forming element "PARA2" corresponding to node N3 is previously complementary to the content of the paragraph-forming element "PARA1" corresponding to node N2, the layout routine for the latter-mentioned paragraph-forming element "PARA2" is carried out. When the content of the first-mentioned paragraph-forming element "PARA1" and the layout routine is completed, a calculation is made of absolute coordinate values on the display device with respect to starting positions of output regions of the character data contained in both the paragraph-forming elements. These calculated absolute coordinate values are processed by the output process.

Figure 16:
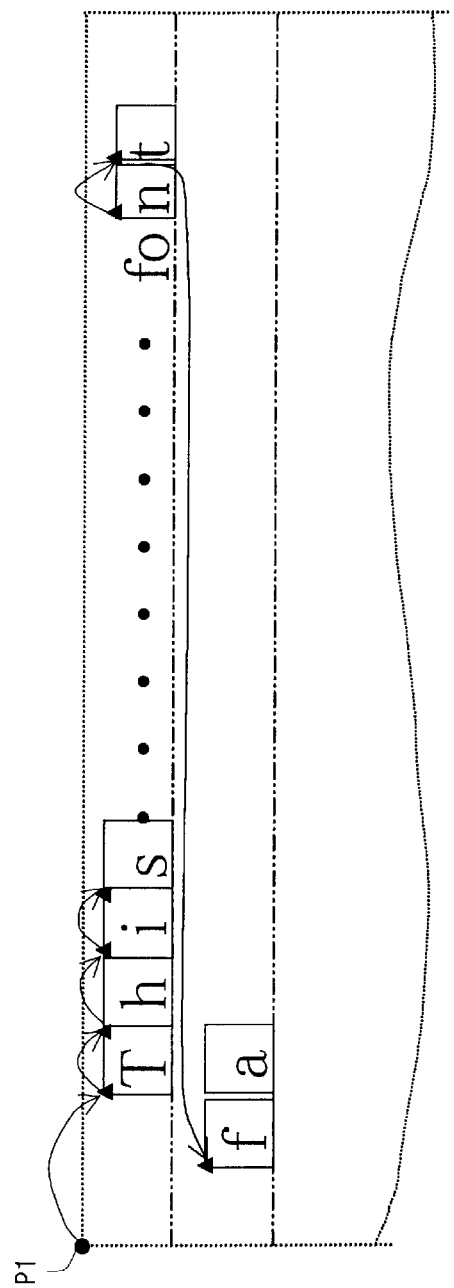
FIG. 16 illustrates another example of a virtual layout of the structured document paragraphs of FIG. 2.

In the above-described first embodiment, the starting positions of the output regions of the respective character data without the paragraph are expressed as the coordinate values while the starting positions P1, P2, . . . , of the occupying regions of the paragraph are employed as the reference. Another expression method may be realized. For instance, as indicated in FIG. 16, the starting positions of the output regions for the respective character data may be expressed as coordinate values while a starting position of an output region for character data located immediately before the above-described character data is used as a reference. In this case, a starting position of an output region for first character data of the current paragraph-forming element may be expressed as a coordinate while the starting position of the occupying region of the paragraph is used as a reference.

In the above-described first embodiment, when the character data row cannot be stored into the present line, the character data is deleted one by one from the last character data contained in the character data row. An alternative method may be employed. For example, the width of the output area of the head character data is added to the character data row one by one from the head. Every time the head character is added to the character data row, it is determined whether the output region of the character data scream can be filled into the present line. When the output region cannot be filled into the present line, the character data subsequent to the current character data are laid out in the lines subsequent to the next line.

In accordance with the present invention, since the display process is virtually performed from the displayable portion of the structured document, the high-speed display operation can be realized without changing the structure of the structured document even as to the document containing a huge amount of data such as the manual and the specification, and also such a document that the contents of the structural elements are distributed on the network to be saved.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. A structured document visual output method for a structured document processing system separately processing markup-language structured document information, and style information defining display style of the structured document information in terms of the markup language, said structured document visual output method comprising:

determining whether paragraph-forming elements are contained in structured document information being processed for visual output in a display sequence by the structured document processing system, the paragraph-forming elements defining paragraph formation in corresponding style information available to the structured document processing system;

obtaining display information for a current paragraph-forming element, and carrying out a paragraph internal layout routine that determines positional relationships between items of the obtained display information independently for each paragraph-forming element, the paragraph internal layout routine being completed for the current paragraph-forming element and for all paragraph-forming elements that are higher in rank in the display sequence than the current paragraph-forming element;

determining absolute display positions, on a structured document processing system-associated display device, for the display information contained in each paragraph-forming element up to the current paragraph-forming element, and for each paragraph-forming element, determining the absolute display positions for the display information after determining the positional relationships, the display position of a particular paragraph-forming element being determined according to a display area of an immediately preceding paragraph-forming element; and outputting information processed by the structured document processing system in said determining whether paragraph-forming elements are contained in structured document information, in said obtaining display information for a current paragraph-forming element, and in said determining absolute display positions, as visual output to the system-associated display device.

2. A structured document visual output method as set forth in claim 1, wherein in said obtaining display information for a current paragraph-forming element, relative layout within a display information paragraph determined in the paragraph internal layout routine is expressed as coordinates taking a position of other display information laid out in the current paragraph as a reference.

3. A structured document visual output method as set forth in claim 1, wherein:

relative layout within a display information paragraph determined in the paragraph internal layout routine is expressed as coordinates taking an initial position in the current paragraph layout area as a reference.

4. A computer-readable recording medium configured with a structured document visual output program for a structured document processing system separately processing markup-language structured document information, and style information defining display style of the structured document information in terms of the markup language, said structured document visual output program for executing:

obtaining, from structural elements of markup-language structured document information being processed for visual output in a display sequence by a structured document processing system, a paragraph-forming element that designates paragraph formation in corresponding style information available to the structured document processing system;

determining whether complementary display information for an obtained current paragraph-forming element is present, and when complementary display information is not present, storing the current paragraph-forming element as a standby paragraph-forming element;

executing a paragraph internal layout routine to determine relative layout, within a display information paragraph, of all display information for the current paragraph-forming element, independently of layout routines for other paragraph-forming elements;

determining whether display information complementary to any of the standby paragraph-forming elements is present, and deleting the current paragraph-forming element from storage as a standby paragraph-forming element when complementary display information is present; and after the paragraph internal layout routine is completed for the current paragraph-forming element and for all paragraph-forming elements that are higher in rank in the display sequence than the current paragraph-forming element, visually outputting the display information processed in said obtaining a paragraph-forming element, in said determining whether complementary display information for an obtained current paragraph-forming element is present, in said executing a paragraph internal layout routine, and in said determining whether display information complementary to any of the standby paragraph-forming element is present, of said structured document visual output program for the current paragraph-forming element and for all paragraph-forming elements that are higher in rank than the current paragraph-forming element.

5. A structured document visual output system for separately processing markup-language structured document information, and style information defining display style of the structured document information in terms of the markup language, comprising:

obtain paragraph-forming element means for obtaining, from structural elements of markup-language structured document information being processed for visual output in a display sequence by said structured document visual output system, a paragraph-forming element that designates paragraph formation in corresponding style information available to the structured document processing system;

means for determining whether complementary display information for an obtained current paragraph-forming element is present, and when complementary display information is not present, for storing the current paragraph-forming element as a standby paragraph-forming element;

layout means for executing a paragraph internal layout routine to determine relative layout, within a display information paragraph, of all display information for the current paragraph-forming element, independently of layout routines for other paragraph-forming elements;

standby exclusion means for determining whether display information complementary to any of the standby paragraph-forming elements is present, and for excluding the current paragraph-forming element from storage as a standby paragraph-forming element when complementary display information is present; and output means for visually outputting the display information processed by the structured document visual output system for the current paragraph-forming element and for all paragraph-forming elements higher-ranking in the display sequence than the current paragraph-forming element, after the paragraph internal layout routine is completed for the current paragraph-forming element and for all paragraph-forming elements that are higher in rank than the current paragraph-forming element.

6. A structured document visual output method for a structured document processing system that separately processes markup language structured document information and corresponding style information, comprising:

identifying paragraph-forming elements in the structured document information and obtaining display information for a current paragraph-forming element, the paragraph-forming elements defining paragraph formation according to the corresponding style information;

executing a paragraph internal layout routine that determines, independently for each paragraph-forming element, positional relationships between items of the obtained display information, the paragraph internal layout routine being executed for the current paragraph-forming element after obtaining all items of display information for the current paragraph-forming element;

determining display positions in a display area for the items of the display information for the current paragraph-forming element and one or more higher order paragraph-forming elements, after determining the positional relationships for the current paragraph-forming element and the one or more higher order paragraph-forming elements; and displaying the current paragraph-forming element and the one or more higher order paragraph-forming elements after determining the display positions in the display area for the current paragraph-forming element and the one or more higher order paragraph-forming elements.

7. A structured document visual output system for separately processing markup-language structured document information, and style information defining display style of the structured document information in terms of the markup language, comprising:

an obtain paragraph-forming element unit obtaining, from structural elements of markup-language structured document information being processed for visual output in a display sequence by said structured document visual output system, a paragraph-forming element that designates paragraph formation in corresponding style information available to the structured document processing system;

a complementary display information determining unit determining whether complementary display information for an obtained current paragraph-forming element is present, and when all items of the complementary display information are not present, storing the current paragraph-forming element as a standby paragraph-forming element;

a layout unit executing a paragraph internal layout routine to determine relative layout, within a display information paragraph, of all display information for the current paragraph-forming element, independently of layout routines for other paragraph-forming elements;

a unit deleting the standby paragraph-forming element from storage when all items of display information for the current paragraph-forming element are present;

a unit determining whether display positions for the items of the display information can be calculated for the current paragraph-forming element after the paragraph internal layout routine is completed for the current paragraph-forming element, and calculating the display positions when calculation is possible; and a unit visually outputting the items of display information for the current paragraph-forming element after calculation of the display positions is completed.

* * * * *